United States Patent Office 3,052,609
Patented Sept. 4, 1962

3,052,609
PROCESS FOR THE PREPARATION OF
D-ARABOASCORBIC ACID
Takeshi Takahashi, Bunkyo-ku, Tokyo, Japan, assignor to Sankyo Company, Limited, Tokyo, Japan
No Drawing. Filed Apr. 18, 1961, Ser. No. 103,726
Claims priority, application Japan Apr. 21, 1960
6 Claims. (Cl. 195—36)

This invention relates to a new process for preparing D-araboascorbic acid (iso-ascorbic acid) by fermentation.

Heretofore, it has been proposed to prepare D-araboascorbic acid by converting D-glucose to 2-keto-D-gluconic acid which is then subjected to lactonization and enolation. However, the known method is industrially disadvantageous in that there are involved a number of steps.

As a result of studies on the simple and useful method of producing D-araboascorbic acid, it has now been discovered that a fermentation process as described below in details provides an easy and one-step method of preparing D-araboascorbic acid.

It is an object of this invention to provide a simple and useful process for preparing D-araboascorbic acid in one step by fermentation. Other objects of this invention will be apparent from the description herein below.

According to this invention, the above-described and other objects can be accomplished by subjecting one or more substances selected from the group consisting of D-glucose, D-gluconic acid, D-glucono-γ-lactone, D-glucono-δ-lactone, sucrose, maltose and starch to the action of an enzyme of a microorganism selected from the group consisting of *Penicillium decumbens, Penicillium chrysogenum, Penicillium chrysogenum* mut. *fulvescens* Takashima, Arima and Abe, *Penicillium meleagrinum, Penicillium cyaneofulvum* and *Penicillium notatum*.

In carrying out the process according to this invention, both direct fermentation method and cell suspension process may be applied.

The term "direct fermentation method" used herein means a process comprising inoculation on a suitable nutrient medium with a microorganism and cultivation of the microorganism by means of surface or submerged culture during which period D-araboascorbic acid is produced.

The term "cell suspension process" used herein means a method of producing D-araboascorbic acid by collecting mycelia of microorganism grown on a suitable aqueous nutrient medium and contacting a suitable carbon source with either the intact mycelium or the dried cell preparation prepared from the intact mycelium by treating with an organic solvent such as acetone, ethanol and ethyl ether to effect the transformation.

In carrying out the direct fermentation method, as the aqueous nutrient medium may be employed any medium usable for cultivation of microorganism belonging to Penicillium genus. It is essential, however, to use as the carbon source one or more substances selected from the group consisting of D-glucose, D-gluconic acid, D-glucono-γ-lactone, D-glucono-δ-lactone, sucrose, maltose and starch. These carbon sources may be used without particular limitation of concentration, but lower concentration would result in smaller conversion to D-araboascorbic acid due to consumption of the source for propagation of the cell. Likewise, extremely higher concentration would lead to lower yield of D-araboascorbic acid due to greater conversion to by-products other than D-araboascorbic acid and due to larger amount of residual sugar. It is preferable to use concentrations between about 0.5 and about 10%. It is also preferred to keep the concentration between about 0.5 and 1.0% by continuously adding the material. Other substances present in the medium are organic or inorganic assimilable nitrogen sources, mineral salts such as phosphates and a trace of various metals usually found in the medium as impurities. As the assimilable nitrogen sources are involved wide variety of substances such as amino acids, casein hydrolyzate, fish-meal, soybean powder, meat extract, liver cake, yeast extract, yeast autolyzate and other plant or animal nitrogen-containing substances. Chemical compounds such as urea and ammonium nitrate may be also employed as the nitrogen source. Corn steep liquor is valuable because it contains various organic and inorganic substances.

pH is usually maintained between about 3 and 7 during cultivation. The time required for the fermentation is from 5 and 10 days in case of the surface culture and from 3 to 7 days in case of the submerged culture and the temperature of fermentation is between about 24° C and about 30° C., preferably between about 26° C. and about 28° C. Not any of particular limitation is placed for rate of aeration, but it is sufficient to apply air one-third to twice as much as the amount of liquid per minute. Rate of stirring may be 150 to 400 r.p.m.

The first step of the cell suspension process comprises cultivation of microorganism on the similar medium to those in the direct fermentation method. As the carbon source in this case may be used any carbon source assimilable by Penicillium microorganism. It is unnecessary in this case to add the specific carbon source convertible to D-araboascorbic acid by the microorganism. Other nutrient sources, temperature of cultivation and the like are same as in the direct fermentation method. Initial pH between 5 and 6 may be usually maintained during the cultivation. Mycelia from 5 to 10 days' surface culture or 3 to 7 days' submerged culture are harvested.

The mycelia thus harvested are then used for the transformation procedure either as it is or after well homogenized for subsequent use by means of homogenizer (intact cell method) or they may be used after dehydrated by means of a water-soluble solvent such as acetone or ethanol followed by treatment with a boiling solvent such as ethyl ether and subsequent drying at low temperature (dried cell preparation method). The dried cell preparation prepared in this way may be stored for a long period of time without autolysis as associated in case of the intact cell as well as with D-araboascorbic acid-producing activity about 50% as high as the intact cell.

Production of D-araboascorbic acid using the intact cell or dried cell preparation may be effected by maintaining a solution of one or more substances selected from the group consisting of D-glucose, D-gluconic acid, D-glucono-γ-lactone, D-glucono-δ-lactone, sucrose, maltose and starch in a buffer solution of about pH 4.0–6.0 usually employed in bio-chemical procedures such as M/5-sodium phosphate dibasic-citric acid buffer, M/10-potassium citrate-M/20 borate buffer, M/10-potassium citrate-sodium hydroxide buffer, M/5-potassium phthalate-sodium hydroxide buffer, M/5-acetic acid-sodium acetate buffer, N/5-phthalic acid-N/10-sodium phosphate dibasic buffer, etc. in a concentration between 0.5 and 10% with areation and stirring at a temperature between about 25° C. and about 30° C. for a period of time between about 50 and about 80 hours in the presence of 30–100 mg. of the intact cell or 10–30 mg. of the dried cell preparation per ml. of solution. Alternatively, the substrate may be at intervals added to keep the concentration between about 0.5 and 1.0%. In these cases, it is unnecessary to carry out particular sterilization of the solution of substrate and to add thereto nutrient sources such as nitrogen source.

Isolation of D-araboascorbic acid may be performed by first removing the mycelium by means of filtration or centrifugal procedure and subsequently applying the known procedures for isolating L-araboascorbic acid to the filtrate or supernatant. For example, an adequate amount of barium acetate is added to remove phosphates and sulfates and organic impurities are removed by treatment with active charcoal, followed by adsorption of the desired product on anion-exchange resin such as Amberlite IR–4B and elution with aqueous hydrochloric acid; Furthermore, impurities are removed by means of a small amount of active charcoal and butanol and D-araboascorbic acid is crystallized by concentration in vacuum at low temperature under carbon dioxide, followed by recrystallization from solvent such as acetone or ethanol-ligroin.

The following examples illustrate methods of carrying out this invention, but it is to be understood that these examples are given by way of illustration and not of limitation.

*Example 1*

One liter of sterilized culture medium containing 20 g. of D-glucose, 1 g. of ammonium sulfate, 1 g. of sodium nitrate, 1 g. of urea, 1 g. of magnesium sulfate, 1 g. of manganese sulfate, 2.5 g. of potassium phosphate monobasic, and a trace of zinc sulfate having pH of 5.0–6.0 is inoculated with *Penicillium notatum* and incubation is made at 28° C. for 7 days. The yield of D-araboascorbic acid in the culture solution amounts to 0.5–1.2 g./l.

The culture filtrate, after treatment with 1 g. of barium acetate and 0.1 g. of active charcoal, is adsorbed on ion-exchange resin IR–4B, followed by elution with 1 l. of 1 N-HCl. About 70% of the total content of the desired product is eluted in fractions in volume of 200–300 ml. after initiation of the elution. These fractions are shaken with butanol and, after addition of a small amount of active charcoal, are filtered to give an almost colorless transparent liquor, which is concentrated to near dryness in vacuum at temperature below 30° C. under $CO_2$, followed by several concentrations in the presence of ethanol to remove most portion of water. The oily substance thus obtained is allowed to stand in a vacuum desiccator for 2–3 days to separate about 0.3 g. of crystalline D-araboascorbic acid.

The crystals are washed with acetone and recrystallized from hot acetone to give white needles melting at 165° C. (with decomposition). Repeated recrystallization gives crystals melting at 172° C.

*Analysis.*—Found: C, 41.27; H, 4.66. Calc'd for $C_6H_8O_6$: C, 40.91; H, 4.58. $[\alpha]_D^{26.5}=-23°$. The IR spectrum is identical with that of authentic D-araboascorbic acid synthesized by the conventional method.

Oxidation of the eluate from the ion-exchange resin column as above with bromine and addition of an excess of a solution of 2.4-dinitrophenylhydrazine in 2 N-hydrochloric acid followed by allowed to stand at 37° C. for 5–7 days yield D-araboascorbic acid 2.4-dinitrophenylhydrazone. Two recrystallizations from ethanol-acetone (1:1) gives red crystalline osazone melting at 238–240° C. The M.P., elemental analysis and IR spectrum are identical with those of the authentic sample.

*Example 2*

To mycelium of *Pencillium decumbens* obtained from the cultivation on a culture medium of the same composition as in Example 1 except that 20 g. of sucrose is used in place of 20 g. of glucose is added a solution of 20 g. of D-glucose in an about pH 5 phosphate-buffer solution and the mixture is allowed to stand at 27° C. for 3 days. The yield of D-araboascorbic acid in the culture solution amounts to 2–3 g./l. The desired product, D-araboascorbic acid, is extracted by the same method as described in Example 1; yield about 0.6 g.

*Example 3*

Ten liter of culture medium having of 40 g. of D-glucose, 1 g. of ammonium sulfate, 1 g. of urea, 1 g. of magnesium sulfate, 2.5 g. of potassium phosphate monobasic, 2.5 g. of calcium carbonate per liter and pH of 5.6 are inoculated with *Penicillium chrysogenum*. Incubation is made under aeration at 25° C. for about 4 days to form the desired product in an amount of about 4.2 g. per liter.

Crystals of D-araboascorbic acid are obtained in the same way as in Example 1; yield 0.8 g.

*Example 4*

One liter of culture medium containing 40 g. of sucrose, 1 g. of ammonium sulfate, 1.5 g. of urea, 2.5 g. of potassium phosphate monobasic and 1.6 g. of calcium carbonate and having pH of 5.3 is inoculated with *Penicillium meleagrinum*. Incubation is made at 25° C. for 5 days to form the desired product in an amount of about 5.3 g. per liter. D-araboascorbic acid is isolated from the culture solution by the same method as in Example 1; yield about 1.2 g.

*Example 5*

*Penicillium notatum* is subjected either to stationary culture on the same medium as in Example 1 or to culture under aeration on the above-described medium additionally containing 2 g. of calcium carbonate. Cultivation is discontinued at the time when D-araboascorbic acid is formed as much as 5% of the sugar used. The collected mycelium is blended, washed with water and dehydrated with acetone 10 times as much. The acetone is filtered off and the mycelium is dried in vacuum. Ten grams of the dried mycelium are added to one liter of a mixed buffer solution of N/5-phthalic acid and N/10-sodium phosphate dibasic having pH of 5.6 and containing 10% D-glucono-γ-lactone and the mixture is incubated under aeration for about 10 days to produce about 5 g. of D-araboascorbic acid per liter.

Crystals of D-araboascorbic acid is obtained by the same method as in Example 1; yield about 1 g.

*Example 6*

A culture medium containing 20 g. of sucrose, 1 g. of sodium glutamate, 1 g. of urea, 2 g. of potassium phosphate monobasic and 0.8 g. of calcium carbonate per liter and pH of 5.0 is inoculated with *Penicillium cyaneofulvum*. Saking culture is made at 28° C. for 4 days to form 1.4 g. of D-araboascorbic acid per liter.

The desired product is isolated by the same method as described in Example 1; yield about 0.4 g.

*Example 7*

*Penicillium notatum* is subjected to stationary culture for 7 days on a culture medium having pH of 5.6 and the following composition:

| | Percent |
|---|---|
| D-glucose | 4 |
| Urea | 0.2 |
| Ammonium sulfate | 0.1 |
| Potassium phosphate monobasic | 0.25 |
| Magnesium sulfate | 0.1 |
| $Mn^{++}$ and $Zn^{++}$ | Trace |

The mycelium is filtered by a filter press, blended with a velocity of 7000 r.p.m. for a period of one min., washed with water to remove the components of the medium associated. Then sufficiently dehydrated by a filter press and mixed at low temperature with acetone in an amount about 10 times as much. The mixture is well stirred followed by separation of the solvent. The remaining acetone is removed with ethanol in an amount twice as much and the mycelium is rapidly dried in vacuum at low temperature. The dried mycelium thus obtained is added to a mixed buffer solution of N/5-phthalic acid and N/10-sodium phosphate dibasic (pH 5.6) containing 40 mg. of D-glucose per ml. at a rate of 20 mg./ml. Cultivation under aeration is made with stirring for 60 hrs. while maintaining pH above 5.0 for the initial 20 hrs. and about 4.0 for the remaining 40 hrs. by occasional additions of N/5-NaOH to produce 10.3 mg. of D-araboascorbic acid per ml. After completion of the reaction pH is adjusted to 2.0 with $H_2SO_4$ and the mycelium is separated by filtration. The filtrate is treated with about 1 g. of barium acetate and about 0.1 g. of active charcoal per liter followed by filtration. The filtrate is passed through ion-exchange resin IR–4B pretreated with acetic acid to adsorb D-araboascorbic acid contained in the filtrate. The ion-exchange resin column is treated with 1 N-HCl and about 70% of the total content is eluted in 200–300 ml. of the first fractions from the elution. The eluate, after addition of a small amount of active charcoal, is filtered to give almost colorless transparent solution. The solution is concentrated to near dryness in vacuum under $CO_2$. Repeated concentrations after addition of ethanol to the residue give an oily substance almost water free. The oily substance thus obtained is concentrated in vacuum to give crystalline D-araboascorbic acid, the yield of which is about 3 g.

Example 8

Mycelium obtained from culture under aeration with stirring on the same medium as in Example 7 additionally containing calcium carbonate 0.25% is treated with ethanol in place of acetone to dryness. The dried mycelium is added to the buffer solution as described in the previous example containing 10 mg. of D-glucono-γ-lactone and the mixture is cultivated under aeration with stirring at 25° C. for 6 hours to form 5.3 mg. of D-araboascorbic acid per ml.

Crystals of D-araboascorbic acid is obtained in the same way as in Example 7; yield about 1.5 g.

I claim:

1. A process for the production of D-araboascorbic acid which comprises subjecting one or more substances selected from the group consisting of D-glucose, D-gluconic acid, D-glucono-γ-lactone, D-glucono-δ-lactone, sucrose, maltose and starch to the action of an enzyme of a microorganism selected from the group consisting of *Penicillium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* in the presence of oxygen and recovering D-araboascorbic acid formed.

2. A process for the production of D-araboascorbic acid which comprises cultivating a microorganism selected from the group consisting of *Penicillium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* under aerobic conditions in an aqueous nutrient medium containing one or more substances selected from the group consisting of D-glucose, D-gluconic acid, D-glucono-γ-lactone, D-glucono-δ-lactone, sucrose, maltose and starch and recovering D-araboascorbic acid formed.

3. A process for the production of D-araboascorbic acid which comprises adding intact cell produced by a microorganism selected from the group consisting of *Penicillium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* to buffer solution of about pH 4 to 6 containing one or more substances selected from the group consisting of D-glucose, D-gluconic acid, D-glucono-γ-lactone, D-glucono-δ-lactone, sucrose, maltose and starch, stirring the resulting mixture and recovering D-araboascorbic acid formed.

4. A process for the production of D-araboascorbic acid which comprises adding dried cell preparation obtained from intact cell produced by a microorganism selected from the group consisting of *Penicillium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* to buffer solution of about pH 4 to 6 containing one or more substances selected from the group consisting of D-glucose, D-gluconic acid, D-glucono-γ-lactone, D-glucono-δ-lactone, sucrose, maltose and starch, stirring the resulting mixture and recovering D-araboascorbic acid formed.

5. A process for the production of D-araboascorbic acid which comprises adding intact cell produced by a microorganism selected from the group consisting of *Penicillium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* to buffer solution of about pH 4 to 6 containing one or more substances selected from the group consisting of D-glucose, D-gluconic acid, D-glucono-γ-lactone, D-glucono-δ-lactone, sucrose, maltose and starch, stirring the resulting mixture at a temperature of from about 20° C. to about 30° C. for from about 50 to about 80 hours and recovering D-araboascorbic acid.

6. A process for the production of D-araboascorbic acid which comprises adding dried cell preparation obtained from intact cell produced by a microorganism selected from the group consisting of *Penicilium decumbens*, *Penicillium chrysogenum*, *Penicillium chrysogenum* mut. *fulvescens* Takashima, Arima and Abe, *Penicillium meleagrinum*, *Penicillium cyaneofulvum* and *Penicillium notatum* to buffer solution of about pH 4 to 6 containing one or more substances selected from the group consisting of D-glucose, D-gluconic acid, D-glucono-γ-lactone, D-glucono-δ-lactone, sucrose, maltose and starch, stirring the resulting mixture at a temperature of from about 20° C. to about 30° C. for from about 50 to about 80 hours and recovering D-araboascorbic acid.

No references cited.